(12) United States Patent
Kuroda et al.

(10) Patent No.: US 10,455,140 B2
(45) Date of Patent: Oct. 22, 2019

(54) FOCUS DETECTION DEVICE AND IMAGING SYSTEM

(71) Applicant: CANON KABUSHIKI KAISHA, Tokyo (JP)

(72) Inventors: Yukihiro Kuroda, Inagi (JP); Yoshikazu Yamazaki, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/958,014

(22) Filed: Apr. 20, 2018

(65) Prior Publication Data

US 2018/0316846 A1    Nov. 1, 2018

(30) Foreign Application Priority Data

Apr. 28, 2017  (JP) .................. 2017-089427

(51) Int. Cl.
| | |
|---|---|
| *H04N 5/232* | (2006.01) |
| *G02B 7/34* | (2006.01) |
| *H04N 5/3745* | (2011.01) |
| *H04N 5/374* | (2011.01) |
| *H04N 5/345* | (2011.01) |
| *H04N 5/369* | (2011.01) |

(Continued)

(52) U.S. Cl.
CPC .......... *H04N 5/23212* (2013.01); *G02B 7/09* (2013.01); *G02B 7/346* (2013.01); *G02B 27/0955* (2013.01); *H04N 5/232122* (2018.08); *H04N 5/3454* (2013.01); *H04N 5/3696* (2013.01); *H04N 5/3741* (2013.01); *H04N 5/37452* (2013.01)

(58) Field of Classification Search
CPC ............. H04N 5/23212; H04N 5/3741; H04N 5/37452; H04N 5/3454; H04N 5/3696; G02B 27/0955; G02B 7/09
USPC .................................................. 348/349, 350
See application file for complete search history.

(56) References Cited

U.S. PATENT DOCUMENTS 5,068,737 A * 11/1991 Taniguchi .............. H04N 5/353
                                                                348/350
5,241,167 A *  8/1993 Suzuki ................... G02B 7/346
                                                                250/201.8
6,311,019 B1   10/2001 Ide
(Continued)

FOREIGN PATENT DOCUMENTS

| JP | 2000-131595 A | 5/2000 |
| JP | 2005-300844 A | 10/2005 |

*Primary Examiner* — Albert H Cutler
(74) *Attorney, Agent, or Firm* — Venable LLP

(57) ABSTRACT

A focus detection device includes a field lens, a secondary image forming lens configured to capture a light flux from the field lens and to form a pair of images from light fluxes from different pupil positions, and a photoelectric conversion device including a pixel region including at least one focus detection region pair that detects the pair of images. The photoelectric conversion device includes pixels arranged in the pixel region in a matrix. The photoelectric conversion device includes control lines each supplying control signal to at least a part of pixels on a corresponding row, and output lines each receiving a signal from at least a part of pixels on a corresponding column. At least a pair of the pixels connected to a common control line or a common output line form the at least one focus detection region pair and output signals to be used for focus detection.

17 Claims, 12 Drawing Sheets

(51) Int. Cl.
*G02B 27/09* (2006.01)
*G02B 7/09* (2006.01)

(56) References Cited

U.S. PATENT DOCUMENTS

| | | | | |
|---|---|---|---|---|
| 7,515,819 | B2 | 4/2009 | Takahashi | |
| 7,995,910 | B2 * | 8/2011 | Kageyama | G02B 3/0037 250/201.8 |
| 8,184,197 | B2 * | 5/2012 | Deng | G02B 7/285 348/345 |
| 2001/0036361 | A1 * | 11/2001 | Suda | G03B 13/32 396/111 |
| 2001/0045989 | A1 * | 11/2001 | Onuki | G02B 7/28 348/345 |
| 2003/0189662 | A1 * | 10/2003 | Matsuda | G02B 7/28 348/345 |
| 2007/0206940 | A1 * | 9/2007 | Kusaka | G03B 13/28 396/128 |
| 2010/0149389 | A1 * | 6/2010 | Goto | G02B 7/34 348/280 |
| 2013/0182156 | A1 * | 7/2013 | Moriya | H04N 5/335 348/294 |
| 2013/0214128 | A1 * | 8/2013 | Yamashita | H01L 27/14609 250/208.1 |
| 2015/0207981 | A1 * | 7/2015 | Yamamoto | H04N 5/23212 348/231.99 |

* cited by examiner

FOCUS DETECTION DEVICE AND IMAGING SYSTEM

BACKGROUND OF THE INVENTION

Field of the Invention

The present invention relates to a focus detection device and an imaging system.

Description of the Related Art

An imaging system that selectively switches a light received via an imaging lens between a solid-state imaging device and a focus detection device and performs image capturing and focus detection is known. As a focus detection device used for such an imaging system, a device that performs phase difference detection of an object image to perform focus detection is known. A phase difference of an object image can be detected based on a spacing of two images that are re-imaged by dividing an incident light flux from an imaging lens and using secondary image forming lenses, and a drive direction and amount of an imaging lens for focusing can be calculated from the detected phase difference.

Due to the increased number of pixels and the increased speed of solid-state imaging devices, a higher accuracy and a higher speed are desired for focus detection devices. Japanese Patent Application Laid-Open No. 2005-300844 discloses a focus detection device that improves the focus detection accuracy by arranging linear sensors of photoelectric conversion device in a staggered manner.

However, since the focus detection device disclosed in Japanese Patent Application Laid-Open No. 2005-300844 intends to improve the focus detection accuracy by arranging the position of two linear sensors relatively shifted in an alignment direction, the focus detection accuracy depends on a shift amount and a shift direction of two linear sensors. Further, in general, although a reduced pixel pitch may improve the focus detection accuracy, it is difficult to achieve both improvement in the focus detection accuracy and increase in the focus detection speed because the focus detection speed decreases due to the increased number of pixels.

SUMMARY OF THE INVENTION

An object of the present invention is to provide a focus detection device that can achieve both improvement in the focus detection accuracy and increase in the focus detection speed.

According to an aspect of the present invention, there is provided a focus detection device including a field lens, a secondary image forming lens configured to capture a light flux that has passed through the field lens and to form a pair of images from light fluxes that have passed through different pupil positions of an imaging lens, and a photoelectric conversion device including a pixel region including at least one focus detection region pair that detects the pair of images, wherein the photoelectric conversion device includes a plurality of pixels arranged in the pixel region so as to form a matrix of a plurality of rows and a plurality of columns, wherein each of the plurality of pixels includes a photoelectric converter, an amplifier transistor, and a transfer transistor that transfers charges to the amplifier transistor, wherein the photoelectric conversion device includes a plurality of control lines arranged correspondingly to the plurality of rows, each of the plurality of control lines supplying control signal to at least a part of pixels on a corresponding row of the plurality of rows, wherein the photoelectric conversion device includes a plurality of output lines arranged correspondingly to the plurality of columns, each of the plurality of output lines receiving a signal from at least a part of pixels on a corresponding column of the plurality of columns, and wherein at least a pair of the pixels connected to a common control line of the plurality of control lines or connected to a common output line of the plurality of output lines form the at least one focus detection region pair and output signals to be used for focus detection.

Further, according to another aspect of the present invention, there is provided a method of driving a photoelectric conversion device including a plurality of control lines arranged in a first direction, a plurality of output lines arranged in a second direction intersecting the first direction, and a pixel region that includes a plurality of pixels that are provided at intersections of the plurality of control lines and the plurality of output lines, respectively, output signals based on charges generated by photoelectric converters in accordance with control signals supplied to the control lines, and includes a first focus detection region pair used for detecting a parallax in the first direction and a second focus detection region pair used for detecting a parallax in the second direction, the method including dividing the pixel region into a first divided region in which the first focus detection region pair is arranged, a second divided region in which one focus detection region of the second focus detection region pair is arranged, and a third divided region in which the other focus detection region of the second focus detection region pair is arranged and performing readout of signals from the pixels for each of the first divided region, the second divided region, and the third divided region.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

A focus detection device according to a first embodiment of the present invention will be described with reference to FIG. 1 to FIG. 7.

Figure 1:
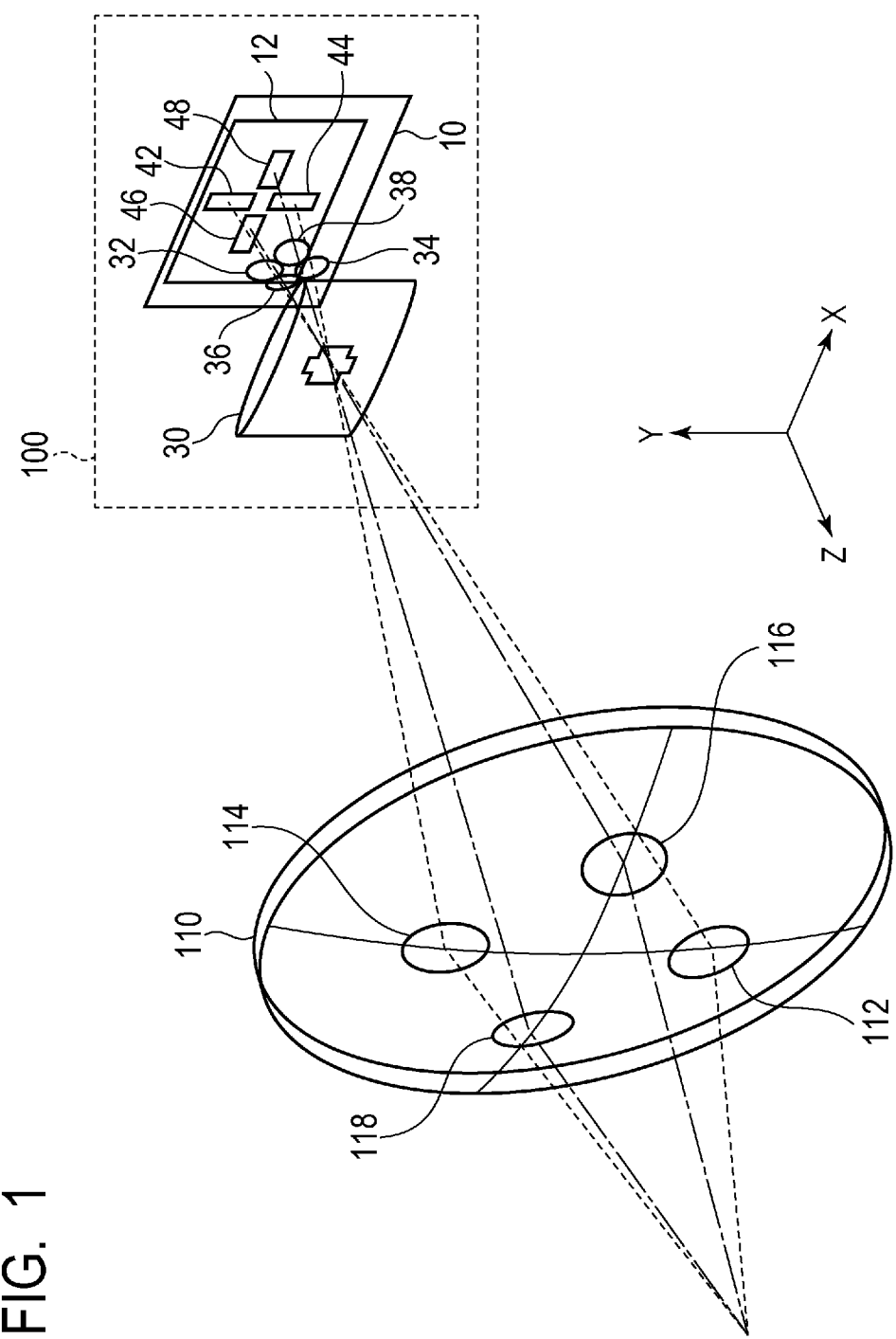
FIG. 1 is a perspective view illustrating a general configuration of a focus detection device according to a first embodiment.

First, the general configuration of the focus detection device according to the present embodiment will be described by using FIG. 1. FIG. 1 is a perspective view illustrating a general configuration of the focus detection device according to the present embodiment.

As illustrated in FIG. 1, a focus detection device 100 according to the present embodiment includes a photoelectric conversion device 10, a field lens 30, and secondary image forming lenses 32, 34, 36, and 38. The photoelectric conversion device 10 has a pixel region 12 including focus detection regions 42, 44, 46, and 48. The field lens 30 is arranged near a planned imaging plane of an imaging lens 110. The secondary image forming lenses 32, 34, 36, and 38 are arranged so as to re-image a light flux that has passed through the field lens 30 on the focus detection regions 42, 44, 46, and 48.

For simplified illustration, it is here assumed that the imaging plane of the photoelectric conversion device 10 is located on an extended line of the optical axis of the imaging lens 110, and the coordinate system illustrated in FIG. 1 is used for illustration. That is, a light flux from an object propagates substantially in the −Z-direction and enters the photoelectric conversion device 10 via the imaging lens 110, the field lens 30, and the secondary image forming lenses 32, 34, 36, and 38. The X-Y plane is parallel to an imaging plane of the photoelectric conversion device 10. On the imaging plane of the photoelectric conversion device 10, the X-direction is the horizontal direction, for example, and the Y-direction is the vertical direction, for example.

It is assumed that there are four pupil positions 112, 114, 116, and 118 on the imaging lens 110 as illustrated in FIG. 1. The pupil positions 112 and 114 are symmetrical positions with respect to the center of the imaging lens 110 in a direction along the Y-direction. The pupil positions 116 and 118 are symmetrical positions with respect to the center of the imaging lens 110 in a direction along the X-direction.

A light flux of the light fluxes from an object that has passed through the pupil position 112 of the imaging lens 110 is guided by the photoelectric conversion device 10 via the field lens 30 and the secondary image forming lens 32 and enters the focus detection region 42. Thereby, the light flux that has passed through the pupil region 112 is re-imaged at a capturing magnification defined by the field lens 30 and the secondary image forming lens 32 and forms an object image on the focus detection region 42. Further, a light flux of the light fluxes from an object that has passed through the pupil position 114 of the imaging lens 110 is guided by the photoelectric conversion device 10 via the field lens 30 and the secondary image forming lens 34 and enters the focus detection region 44. Thereby, the light flux that has passed through the pupil region 114 is re-imaged at an imaging magnification defined by the field lens 30 and the secondary image forming lens 34 and forms an object image on the focus detection region 44.

The imaging plane of the photoelectric conversion device 10 is arranged in a position optically equal to the imaging plane of a solid-state imaging device (not illustrated) with respect to the imaging lens 110, and the focus detection regions 42 and 44 have a field of view that is a part of or equal to a screen exposed on the imaging plane of the solid-state imaging device. This configuration allows a pair of images having a parallax in the Y-direction to be obtained in the same field of view as the solid-state imaging device.

Similarly, light fluxes of the light fluxes from an object that have passed through the pupil positions 116 and 118 of the imaging lens 110 form object images on the focus detection regions 46 and 48 of the photoelectric conversion device 10 via the field lens 30 and the secondary image forming lenses 36 and 38. Thereby, a pair of images having a parallax in the X-direction can be obtained.

By performing known correlation calculation based on the pair of images having a parallax, it is possible to measure a distance to an object photographed in an image or a defocus amount.

Note that, in the present specification, two focus detection regions used for acquire a pair of images having a parallax in a predetermined direction may be referred to as a focus detection region pair. For example, in the example of FIG. 1, the focus detection regions 42 and 44 form one focus detection region pair, and the focus detection regions 46 and 48 form another focus detection region pair.

Figure 2:
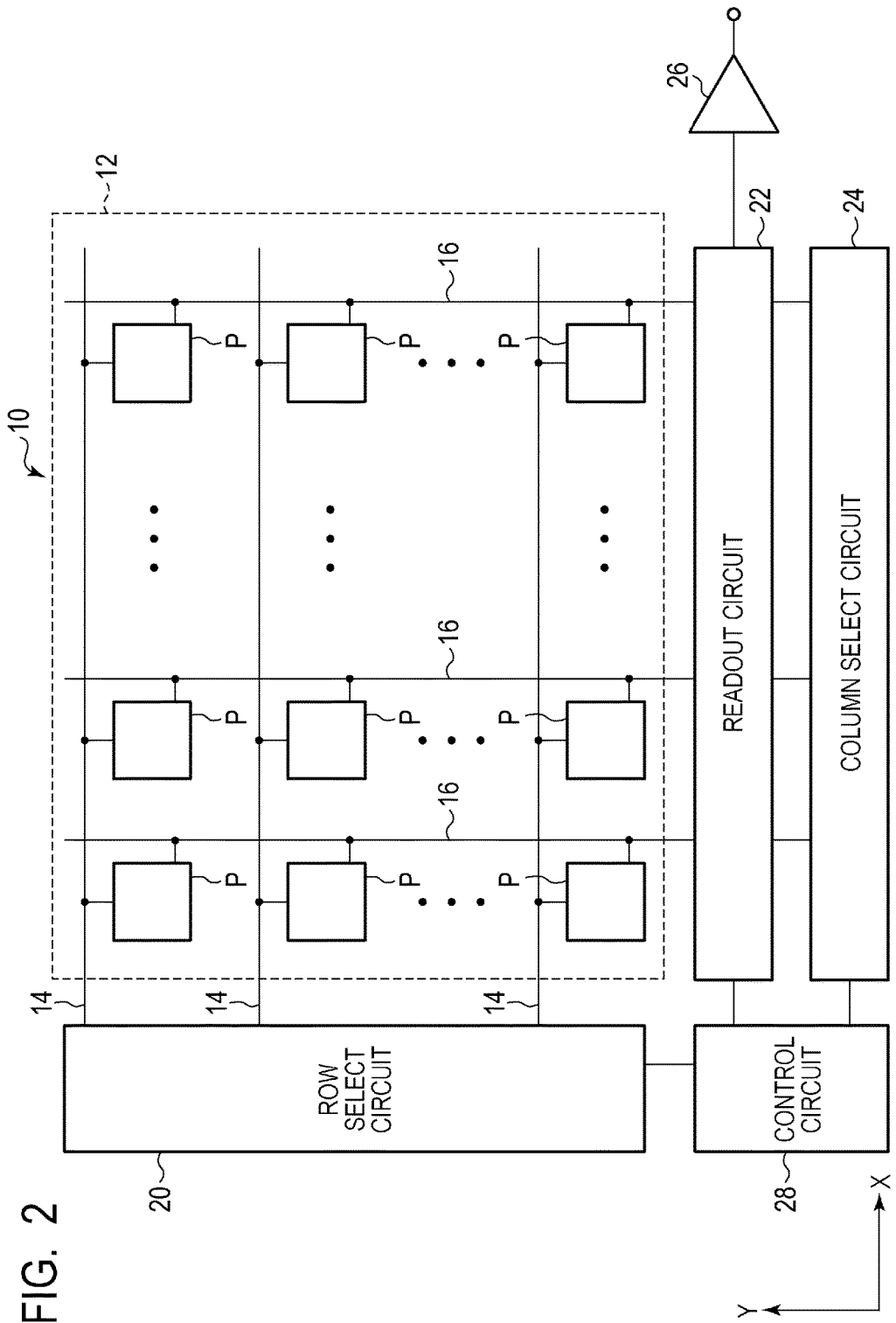
FIG. 2 is a block diagram illustrating a general configuration of a photoelectric conversion device according to the first embodiment.
Figure 3:
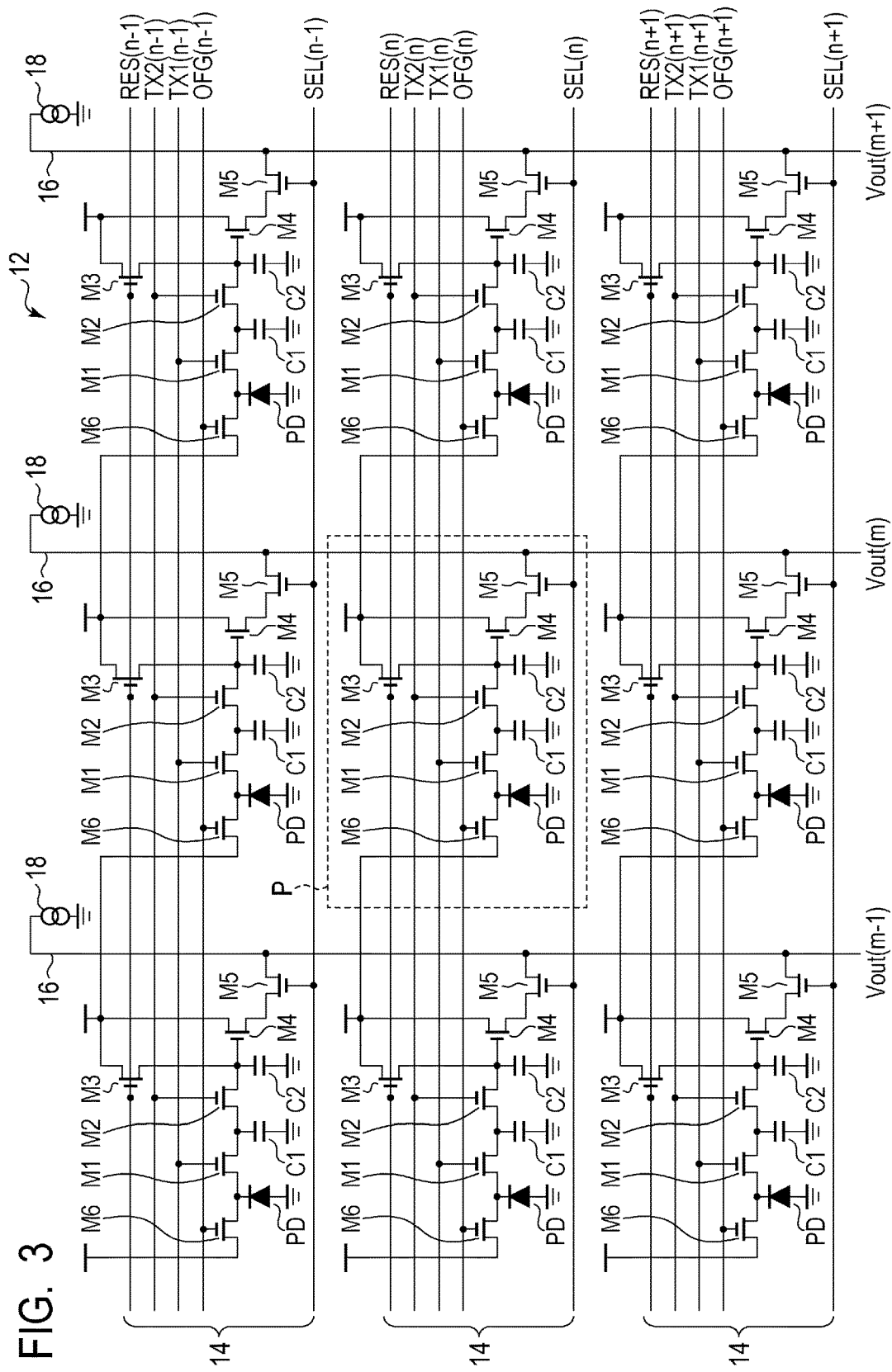
FIG. 3 is a circuit diagram illustrating a configuration example of pixels of the photoelectric conversion device according to the first embodiment.

Next, the structure of the photoelectric conversion device according to the present embodiment will be described in more detail by using FIG. 2 and FIG. 3. FIG. 2 is a block diagram illustrating the general configuration of the photoelectric conversion device according to the present embodiment. FIG. 3 is a circuit diagram illustrating a configuration example of pixels of the photoelectric conversion device according to the present embodiment.

The photoelectric conversion device 10 according to the present embodiment includes a pixel region 12, a row select circuit 20, a readout circuit 22, a column select circuit 24, an output circuit 26, and a control circuit 28, as illustrated in FIG. 2.

In the pixel region 12, a plurality of control lines 14 extending in the row direction (X-direction in FIG. 2) and a plurality of output lines 16 extending in the column direction (Y-direction in FIG. 2) are arranged. The control lines 14 are signal lines connected to the gates of transistors included in the pixels P, for example. Typically, the output lines 16 are signal lines connected to the drains or the sources of amplifier transistors or select transistors of the pixels P. The pixels P are provided at the intersections of the plurality of control lines 14 and the plurality of output lines 16, respectively. The plurality of pixels P are arranged in a matrix over a plurality of rows and a plurality of columns. Each of the pixels P includes a photoelectric conversion element that converts an incident light into charges in accordance with the light amount thereof. The number or rows and the number of columns of the pixel array arranged in the pixel region 12 are not limited in particular.

At least some of the plurality of pixels P included in a single row are connected to one of the control lines 14. Further, at least some of the plurality of pixels P included in a single column are connected to one of the output lines 16. The control line 14 on each row is connected to the pixels P aligned in the row direction, respectively, and form a signal line common to these pixels P. Further, the output line 16 on each column is connected to the pixels P aligned in the column direction, respectively, and form a signal line common to these pixels P. In the present specification, the direction in which the plurality of pixels P connected to one control line 14 are arranged is referred to as the row direction. Further, in the present specification, the direction in which the plurality of pixels P connected to one output line 16 are arranged is referred to as the column direction.

The control lines 14 are connected to the row select circuit 20. The row select circuit 20 is a drive circuit that supplies, to the pixels P via the control lines 14 provided on a row basis of the pixel array, control signals for driving the readout circuit 22 within the pixels P when reading out signals from respective pixels P. The row select circuit 20 can be configured using a shift register or an address decoder. Signals read out from the pixels P are input to the readout circuit 22 via the output lines 16 provided on a column basis of the pixel array.

The readout circuit 22 is a circuit unit that performs a predetermined process, for example, a correlated double sampling (CDS) process or signal processing such as an amplification process on signals read out from the pixels P. The readout circuit 22 may include signal holding units, CDS circuits, column amplifiers, or the like.

The column select circuit 24 is a circuit unit that supplies, to the readout circuit 22, control signals for transferring signals processed in the readout circuit 22 to the output circuit 26 sequentially on a column basis. The column select circuit 24 can be configured by using a shift register or an address decoder. The output circuit 26 is a circuit unit that is formed of a buffer amplifier or a differential amplifier to amplify and output a signal on a column selected by the column select circuit 24.

Note that, in the present specification, the row select circuit 20 may be referred to as a pixel control unit in focusing the functionality thereof. Further, the readout circuit 22, the column select circuit 24, and the output circuit 26 may be collectively referred to as a signal processing unit.

The control circuit 28 is a circuit unit that supplies, to the column select circuit 20, the readout circuit 22, and the column select circuit 24, control signals that control the operation or the timing thereof. Some or all of the control signals supplied to the row select circuit 20, the readout circuit 22, and the column select circuit 24 may be supplied from the outside of the photoelectric conversion device 10.

FIG. 3 is a circuit diagram illustrating an example of pixel circuits forming the pixel region 12. While FIG. 3 depicts nine pixels P arranged in three rows by three columns out of the pixels P forming the pixel region 12, the number of pixels P forming the pixel region 12 is not limited in particular.

Each of the plurality of pixels P includes a photoelectric converter PD, transfer transistors M1 and M2, a reset transistor M3, an amplifier transistor M4, a select transistor M5, and an overflow transistor M6. The photoelectric converter PD is a photodiode, for example. The anode of the photodiode of the photoelectric converter PD is connected to a ground voltage line, and the cathode is connected to the source of the transfer transistor M1 and the source of the overflow transistor M6. The drain of the transfer transistor M1 is connected to the source of the transfer transistor M2. The connection node of the drain of the transfer transistor M1 and the source of the transfer transistor M2 includes a capacitance component and forms a charge holding portion C1. In FIG. 3, the holding portion C1 is represented as a capacitor, one terminal of which is connected to the node. The other terminal of the capacitor forming the holding portion C1 is grounded.

The drain of the transfer transistor M2 is connected to the source of the reset transistor M3 and the gate of the amplifier transistor M4. The connection node of the drain of the transfer transistor M2, the source of the reset transistor M3, and the gate of the amplifier transistor M4 is a so-called floating diffusion (FD) portion. The FD portion includes a capacitance component (floating diffusion capacitor) and forms a charge holding unit C2. In FIG. 3, the holding portion C2 is represented as a capacitor, one terminal of which is connected to the FD portion. The other terminal of the capacitor forming the holding portion C2 is grounded.

The drain of the reset transistor M3, the drain of the amplifier transistor M4, and the drain of the overflow transistor M6 are connected to a power source voltage line (VDD). Note that any two or three of a voltage supplied to the drain of the reset transistor M3, a voltage supplied to the drain of the amplifier transistor M4, and a voltage supplied to the drain of the overflow transistor M6 may be the same, or all of them may be different. The source of the amplifier transistor M4 is connected to the drain of the select transistor M5. The source of the select transistor M5 is connected to the output line 16.

In the case of the pixel configuration of FIG. 3, each of the control lines 14 arranged in the pixel region 12 includes signal lines TX1, TX2, OFG, RES, and SEL. The signal line TX1 is connected to the gates of the transfer transistors M1 of the pixels P belonging to the corresponding row, respectively, and forms a signal line common to these pixels P. The signal line TX2 is connected to the gates of the transfer transistors M2 of the pixels P belonging to the corresponding row, respectively, and forms a signal line common to these pixels P. The signal line RES is connected to the gates of the reset transistors M3 of the pixels P belonging to the corresponding row, respectively, and forms a signal line common to these pixels P. The signal line SEL is connected to the gates of the select transistors M5 of the pixels P belonging to the corresponding row, respectively, and forms a signal line common to these pixels P. The signal line OFG is connected to the gates of the overflow transistors M6 of the pixels P belonging to the corresponding row, respectively, and forms a signal line common to these pixels P. Note that, in FIG. 3, the corresponding row number is provided to the name of each control line (for example, TX1($n-1$), TX1($n$), TX1($n+1$)).

A control signal that is a drive pulse for controlling the transfer transistor M1 is output to the signal line TX1 from the row select circuit 20. A control signal that is a drive pulse for controlling the transfer transistor M2 is output to the signal line TX2 from the row select circuit 20. A control signal that is a drive pulse for controlling the reset transistor M3 is output to the signal line RES from the row select circuit 20. A control signal that is a drive pulse for controlling the select transistor M5 is output to the signal line SEL from the row select circuit 20. A control signal that is a drive pulse for controlling the overflow transistor M6 is output to the signal line OFG from the row select circuit 20. When each transistor is formed of an n-channel transistor, the corresponding transistor is turned on when supplied with a high-level control signal from the row select circuit 20. Further, the corresponding transistor is turned off when supplied with a low-level control signal from the row select circuit 20.

The output line 16 arranged on each column of the pixel region 12 is connected to the sources of the select transistors M5 of the pixels P aligned in the column direction, respectively, and forms a signal line common to these pixels P. Note that the select transistor M5 of the pixel P may be omitted. In this case, the output line 16 is connected to the sources of the amplifier transistors M4. A current source 18 is connected to each of the output lines 16.

The photoelectric converter PD converts (photoelectrically converts) an incident light into charges in accordance with the light amount thereof and accumulates the generated charges. The overflow transistor M6 resets the photoelectric converter PD to a predetermined potential in accordance with the voltage of the power source voltage line. The transfer transistor M1 transfers charges held in the photoelectric converter PD to the holding portion C1. The holding portion C1 holds charges generated by the photoelectric converter PD in a different location from the photoelectric converter PD. The transfer transistor M2 transfers charges held in the holding portion C1 to the holding portion C2. The holding portion C2 holds charges transferred from the holding portion C1 and sets the voltage of the FD portion, which is also the input node of the amplifier unit (the gate of the amplifier transistor M4), to a voltage in accordance with the capacitance of the holding portion C2 and the amount of the transferred charges. The reset transistor M3 is a reset unit that resets the holding portion C2 to a predetermined potential in accordance with the voltage of the power source voltage line VDD. The select transistor M5 selects the pixels P which output signals to the output lines 16. In the amplifier transistor M4, the drain is supplied with the power source voltage, and the source is supplied with a bias current from the current source 18 via the select transistor M5, which forms an amplifier unit (source follower circuit) whose gate is the input node. Thereby, the amplifier transistor M4 outputs a signal Vout based on charges generated by an incident light to the output line 16. Note that, in FIG. 3, the corresponding column number is provided to the signal Vout (for example, Vout(m−1), Vout(m), Vout(m+1)).

According to the pixel configuration illustrated in FIG. 3, charges generated by the photoelectric converter PD during the holding portion C1 holding charges can be accumulated in the photoelectric converter PD. This enables an imaging operation such that exposure periods are matched among the plurality of pixels P, namely, a so-called global electronic shutter operation. With exposure periods matched among the plurality of pixels P of the photoelectric conversion device 10 that outputs focus detection signals, the focus detection accuracy can be improved. Note that electronic shutter means electrically controlling accumulation of charges generated by an incident light. When no global electronic shutter operation is performed, the holding portion C1 and the transfer transistor M1 or M2 may be omitted.

Figure 4:
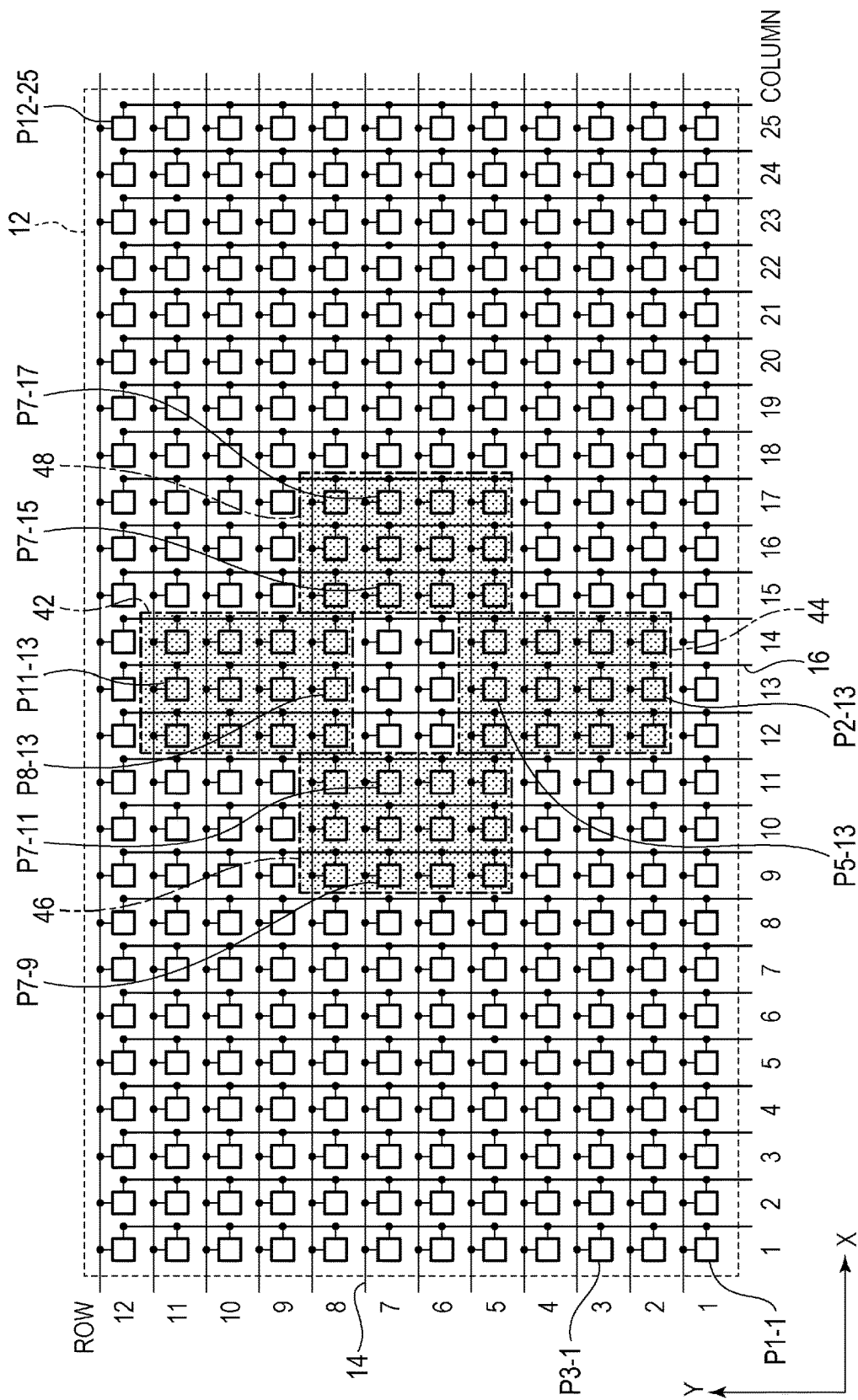
FIG. 4 is a diagram illustrating a configuration example of a pixel region of the photoelectric conversion device according to the first embodiment.

FIG. 4 is a diagram illustrating a configuration example of the pixel region 12 in more detail. As an example here, a case where 12 pixels P are arranged in the Y-direction that is the shorter side direction of the pixel region 12 and 25 pixels P are arranged in the X-direction that is the longer side direction of the pixel region 12 is illustrated. In FIG. 4, alignment in the Y-direction is defined as a row, and alignment in the X-direction is defined as a column. That is, the pixels P of 12 rows by 25 columns are arranged in the pixel region 12. In the present specification, when the pixel P at a particular location is described, the row number and the column number are appended to the reference P of the pixel. For example, the pixel at the first row and the first column is denoted as the pixel P1-1, the pixel at the third row and the first column is denoted as the pixel P3-1, and the pixels at the 12-th row and the 25-th column is denoted as the pixel P12-25.

The pixel region 12 includes at least a pair of focus detection regions. The pixel region 12 may include a plurality of pairs of focus detection regions in order to obtain more ranging points or detect contours in a plurality of directions. The pair of focus detection regions 42 and 44 are each illustrated as a region formed of a pixel array of four rows by three columns as an example. In the focus detection regions 42 and 44, the optically paired pixels P are, for example, the pixel P2-13 and the pixel P11-13, the pixel P5-13 and the pixel P8-13, and the like and used for parallax detection in the Y-direction. The optically paired pixels P in the focus detection regions 42 and 44 are connected to the common output line 16.

Further, the pair of focus detection regions 46 and 48 are each illustrated as a region formed of a pixel array of four rows by three columns as an example. The optically paired pixels P are, for example, the pixel P7-9 and the pixel P7-17, the pixel P7-11 and the pixel P7-15, and the like and used for parallax detection in the X-direction. The optically paired pixels P in the focus detection regions 46 and 48 are connected to the common control line 14.

Figure 5:
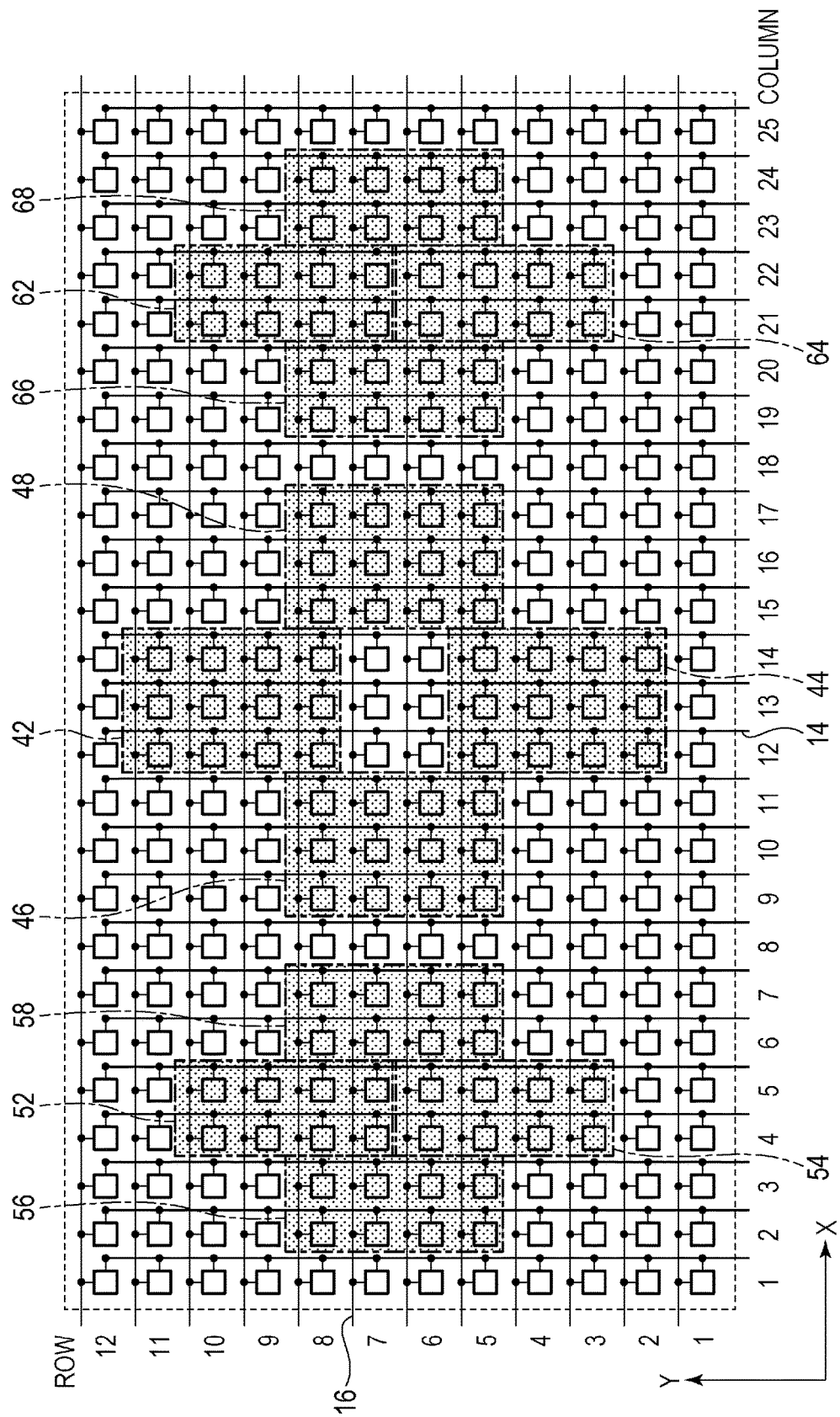
FIG. 5 is a diagram illustrating another configuration example of the pixel region of the photoelectric conversion device according to the first embodiment.

FIG. 5 is a diagram illustrating another configuration example of the pixel region 12. In the configuration example illustrated in FIG. 5, three focus detection blocks each including the focus detection regions paired in the X-direction and the focus detection regions paired in the Y-direction are aligned in the X-direction. That is, a focus detection block including the focus detection regions 42, 44, 46, and 48, a focus detection block including focus detection regions 52, 54, 56, and 58, and a focus detection block including focus detection regions 62, 64, 66, and 68 are arranged in the pixel region 12. Arrangement of focus detection blocks in a plurality of different regions enables focus detection in the plurality of regions, respectively.

In FIG. 5, the focus detection block including the focus detection regions 42, 44, 46, and 48 is the same as that in the case of FIG. 4 and is arranged in the region from the ninth column to the 17-th column. The focus detection block including the focus detection regions 52, 54, 56, and 58 is arranged in the region from the second column to the seventh column. The focus detection block including the focus detection regions 62, 64, 66, and 68 is arranged in the region from the 19-th column to the 24-th column.

The focus detection regions 52, 54, 56, 58, 62, 64, 66, and 68 are each illustrated as a region formed of a pixel array of four rows by two columns as an example. The focus detection regions 52 and 54 are the paired focus detection regions, the focus detection regions 56 and 58 are the paired focus detection regions, the focus detection regions 62 and 64 are the paired focus detection regions, and the focus detection regions 66 and 68 are the paired focus detection regions. The focus detection regions 52 and 54 are used for parallax detection in the Y-direction, and the focus detection regions 62 and 64 are used for parallax detection in the Y-direction. The focus detection regions 56 and 58 are used for parallax detection in the X-direction, and the focus detection regions 66 and 68 are used for parallax detection in the X-direction.

In the similar manner to the case of the configuration example illustrated in FIG. 4, the optically paired pixels P in the focus detection regions 52 and 54 are connected to the common output line 16, and the optically paired pixels P in the focus detection regions 62 and 64 are connected to the common output line 16. Further, the optically paired pixels P in the focus detection regions 56 and 58 are connected to the common control line 14, and the optically paired pixels P in the focus detection regions 66 and 68 are connected to the common control line 14.

Figure 6:
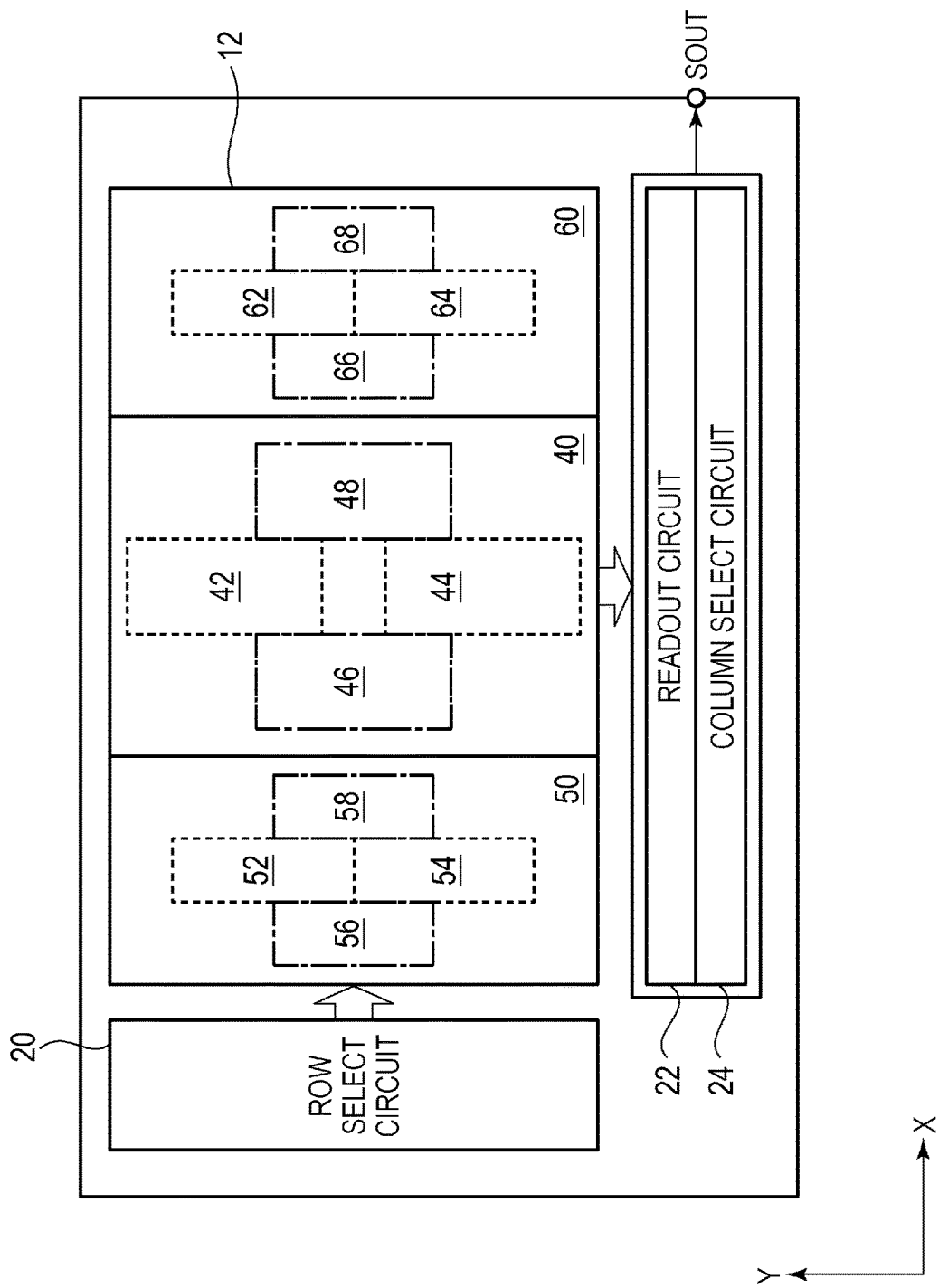
FIG. 6 is a schematic diagram illustrating a relationship between divided regions and focus detection regions in the photoelectric conversion device according to the first embodiment.

Next, a method of driving the photoelectric conversion device according to the present embodiment will be described by using FIG. 6. FIG. 6 is a schematic diagram illustrating a relationship between divided regions and focus detection regions in the photoelectric conversion device according to the present embodiment. In this illustration, the method of driving the photoelectric conversion device will be described for a case where the pixel region 12 has three focus detection blocks illustrated in FIG. 5 as an example.

In the method of driving the photoelectric conversion device according to the present embodiment, divided regions in accordance with focus detection blocks are defined in the pixel region 12, and the pixels P are driven on a divided-region basis. For example, when the pixel region 12 includes three focus detection blocks as illustrated in FIG. 5, the pixel region 12 is divided into three divided regions 40, 50, and 60 in the row direction in a unit of column as illustrated in FIG. 6. The divided region 40 is a region including the focus detection regions 42, 44, 46, and 48. The divided region 50 is a region including the focus detection regions 52, 54, 56, and 58. The divided region 60 is a region including the focus detection regions 62, 64, 66, and 68.

Driving of the pixels P by the row select circuit is performed sequentially on a row basis in the same manner as the case of a typical area sensor. Thereby, signals of respective pixels P on the selected row are output to the readout circuit 22 via the output lines 16. The column select circuit 24 sequentially selects columns corresponding to divided regions to be read out and sequentially outputs pixel signals to the columns as an output signals SOUT. Thereby, the number of pixel signals to be output is reduced compared to the case where the pixel signals on all the columns are output, which enables a high speed readout of the focus detection signal.

For example, it is assumed that readout of signals from the pixels P belonging to the divided region 40 out of three divided regions 40, 50, and 60 of FIG. 6 is performed first. In this case, the columns occupied by the divided region 40 out of all the columns is approximately ⅓, and thus the column scan period when respective rows are read out can be reduced to approximately ⅓. The pixel signals obtained from the divided region 40 include parallax information in the X-direction and the Y-direction, and reduction in the time before the readout of pixel signals from the divided region 40 is completed enables earlier start of focus detection calculation. This allows for quick feedback to automatic focus adjustment of the imaging lens or the like.

Readout of pixel signals from the divided regions 50 and 60 may be performed after readout of pixel signals from the divided region 40, if necessary. Readout of pixel signals from the divided regions 50 and 60 can be performed in parallel to focus detection calculation based on focus detection signals acquired from the divided region 40.

Further, when a single focus detection block is provided as in the configuration example of FIG. 4, the same effect and advantage can be obtained by selectively performing readout of pixel signals from pixels belonging to columns on which the focus detection regions 42, 44, 46, and 48 are arranged in the same manner as the readout from the divided region 40.

In order to perform the operation described above, the column select circuit 24 is configured to be able to selectively read out pixel signals of the pixels P belonging to the divided regions 40, 50, and 60, respectively. For example, when the column select circuit is configured using a decoder, signals on columns corresponding to any of the divided regions 40, 50, and 60 can be selectively output in accordance with input address information. Further, when the column select circuit 24 is configured using a shift register, a column select circuit associated with the divided region 40, a column select circuit associated with the divided region 50, and a column select circuit associated with the divided region 60 can be provided.

Figure 7:
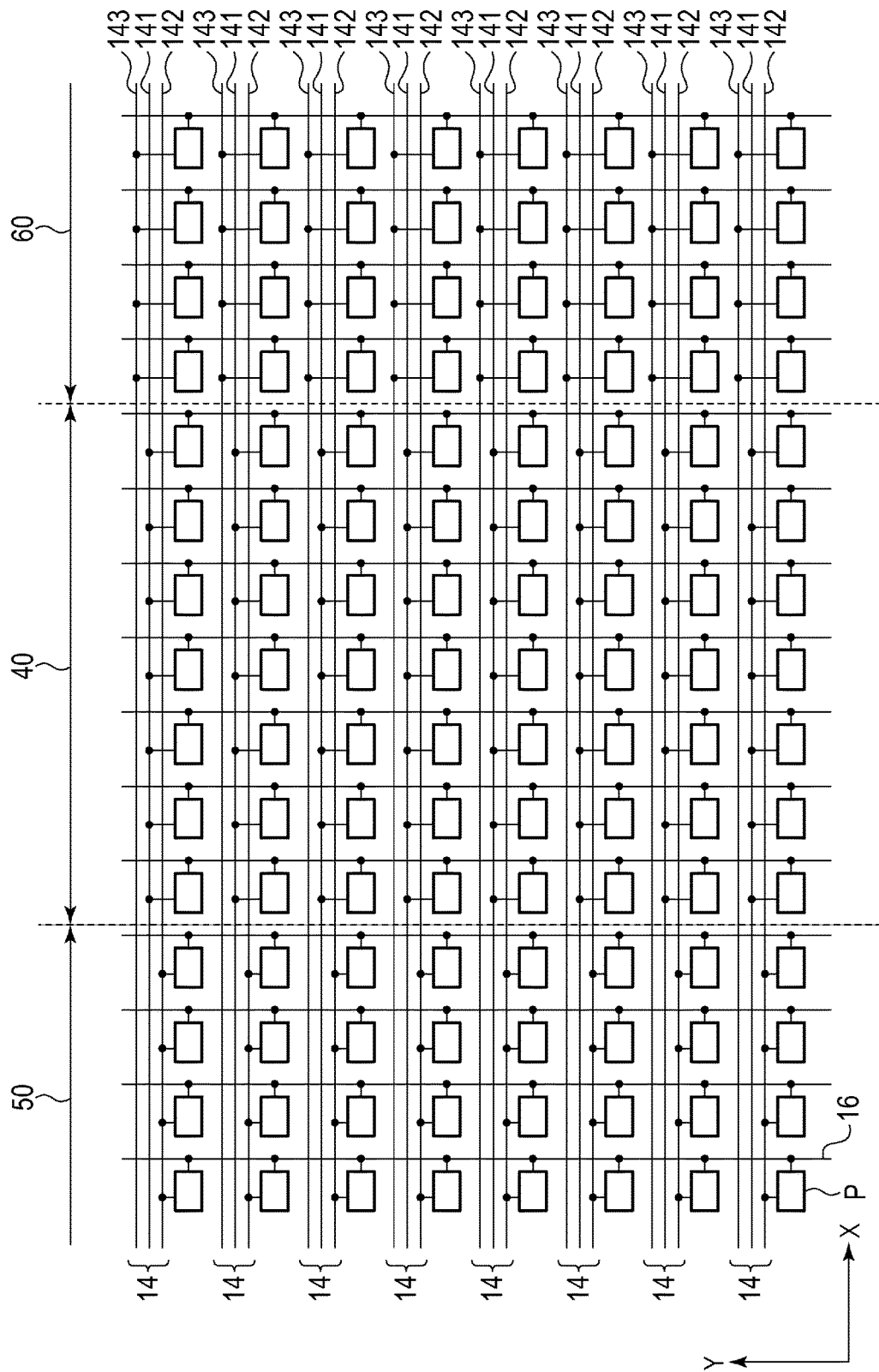
FIG. 7 is a diagram illustrating another configuration example of the pixel region of the photoelectric conversion device according to the first embodiment.

Note that the pixels P belonging to respective divided regions may be separately driven. For example, when three divided regions 40, 50, and 60 as illustrated in FIG. 6 are provided, a set of three control lines 141, 142, and 143 corresponding to the number of divided regions is arranged on each row as illustrated in FIG. 7. The control lines 141 are the control lines 14 connected to the pixels P of the divided region 40. The control lines 142 are the control lines 14 connected to the pixels P of the divided region 50. The control lines 143 are the control lines 14 connected to the pixels P of the divided region 60. This enables independent control of the exposure period or the readout operation of the pixels P of the divided regions 40, 50, and 60.

When performing such an operation, the row select circuit 20 is configured to be able to selectively read out the pixel signals of the pixels P belonging to the divided regions 40, 50, and 60 in the same manner as the column select circuit 24. For example, when the row select circuit 20 is configured using a decoder, any of the control lines 141, 142, and 143 corresponding to the divided regions 40, 50, and 60 can be selectively driven in accordance with input address information. Further, when the row select circuit 20 is configured using a shift register, a row select circuit that drives the control lines 141, a row select circuit that drives the control lines 142, and a row select circuit that drives the control lines 143 can be provided.

As described above, in the photoelectric conversion device according to the present embodiment, a pair of the pixels P forming focus detection regions corresponding to the parallax detection in the Y-direction are connected to the common output line 16. Further, a pair of the pixels P forming focus detection regions corresponding to the parallax detection in the X-direction are connected to the common control line 14. Therefore, more pixels P can be arranged for a focus detection region determined by optical conditions, and thus the resolution of a captured image can be improved. Further, since the pixel control unit and the signal processing unit can be shared, the focus detection region can be expanded or more focus detection regions can be provided. This can improve the focus detection accuracy.

Further, in the photoelectric conversion device according to the present embodiment, pixel signals can be output for each of the divided regions 40, 50, and 60. This enables earlier acquisition of parallax information of a region from which information is intended to be acquired, compared to the case where the pixel signals of the entire pixel region 12 are sequentially output, and therefore can improve the focus detection speed.

Note that, while the example where the pixel region 12 is divided into three divided regions 40, 50, and has been illustrated in the present embodiment, the number of divided regions is not limited to three. For example, columns on which no focus detection region is arranged is set as another divided region to reduce the number of columns to be read out, which enables further improvement in the focus detection speed.

As discussed above, according to the present embodiment, both improvement in the focus detection accuracy and increase in the focus detection speed can be achieved.

Second Embodiment

Figure 8:
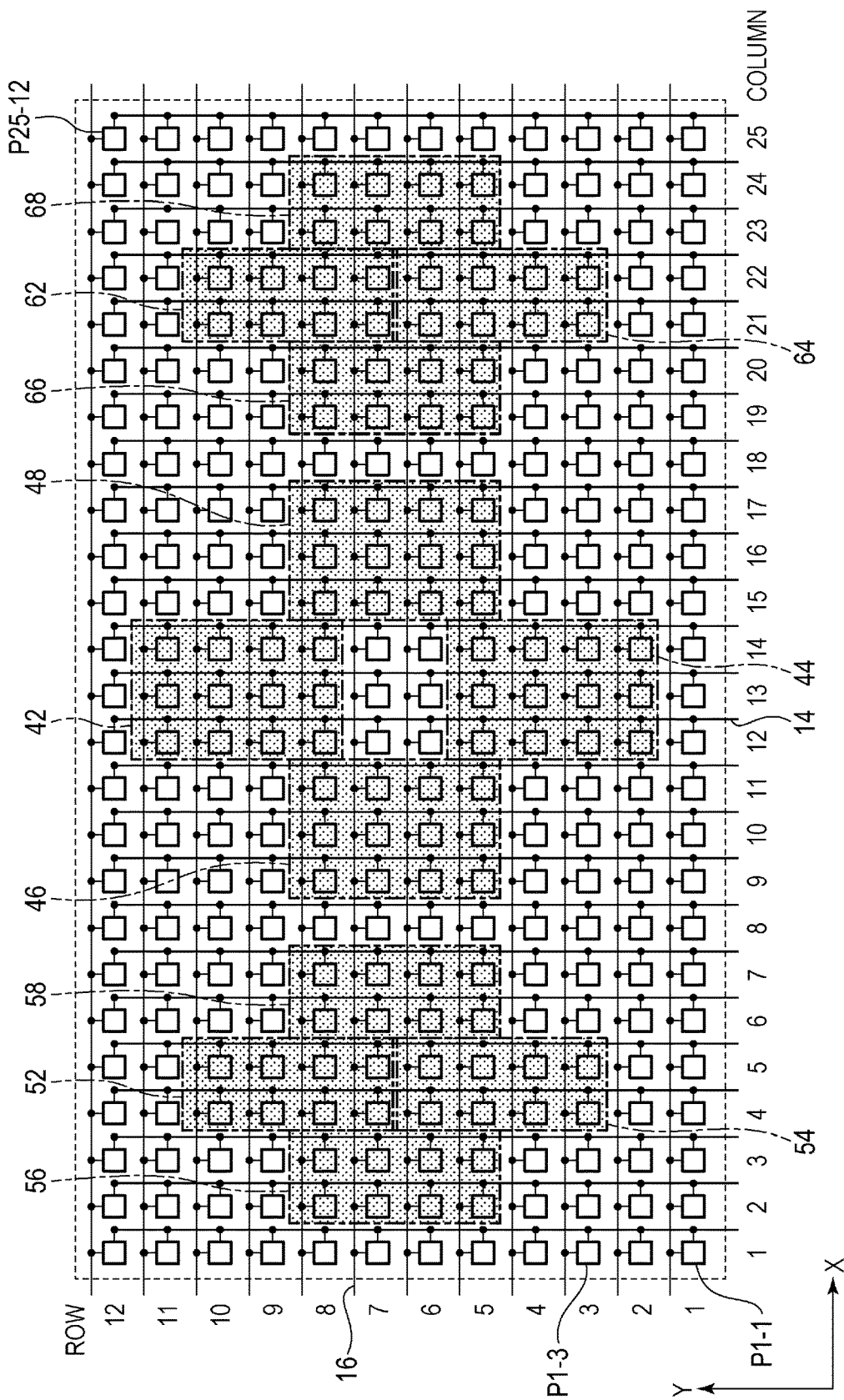
FIG. 8 is a diagram illustrating a configuration example of a pixel region of a photoelectric conversion device according to a second embodiment.
Figure 9:
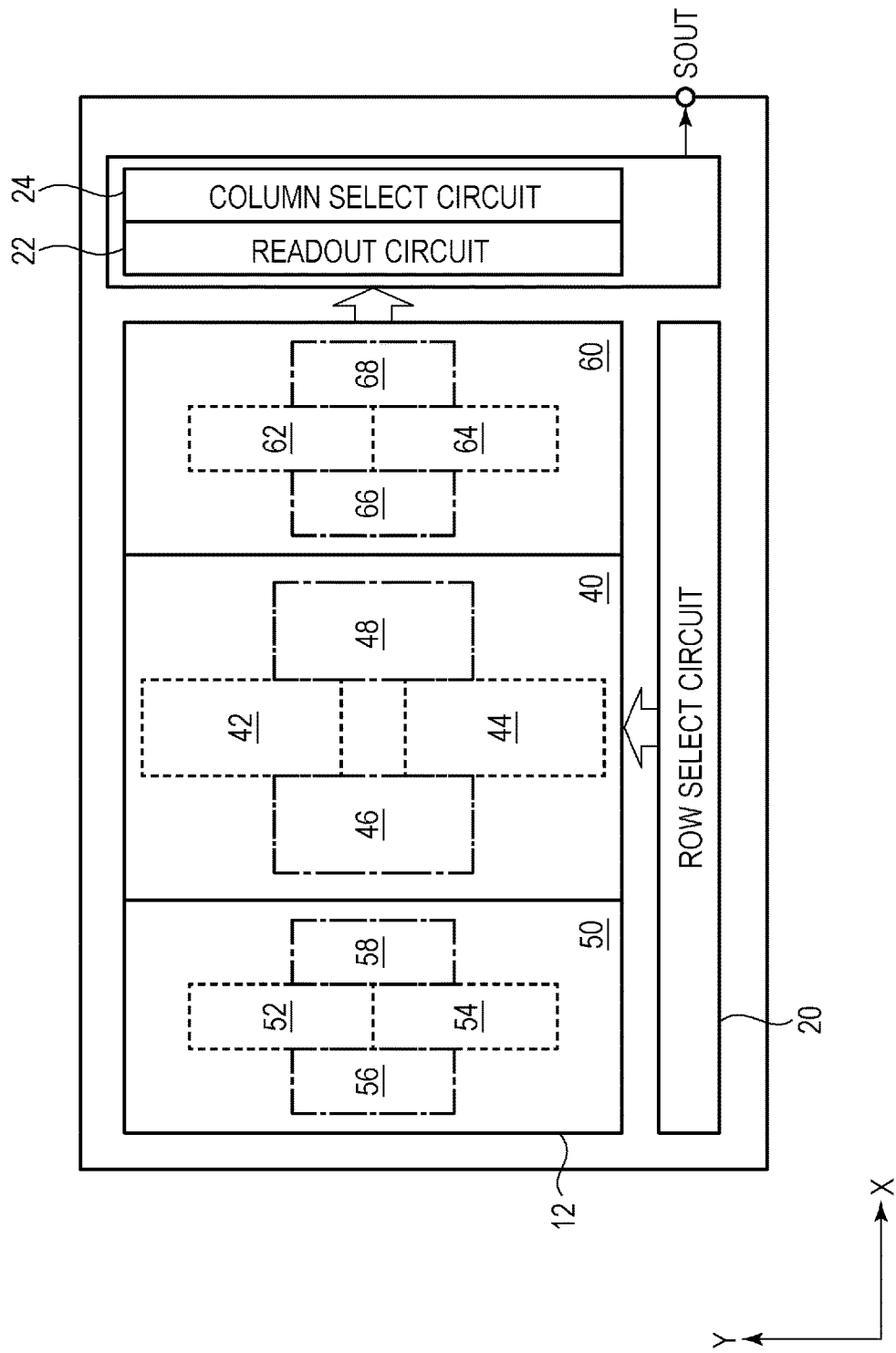
FIG. 9 is a schematic diagram illustrating a relationship between divided regions and focus detection regions in the photoelectric conversion device according to the second embodiment.

A focus detection device according to a second embodiment of the present invention will be described with reference to FIG. 8 and FIG. 9. Similar components to those of the focus detection device according to the first embodiment illustrated in FIG. 1 to FIG. 7 are labeled with the same reference, and the description thereof will be omitted or simplified. FIG. 8 is a diagram illustrating a configuration example of a pixel region of the photoelectric conversion device according to the present embodiment. FIG. 9 is a schematic diagram illustrating a relationship between divided regions and focus detection regions in the photoelectric conversion device according to the present embodiment.

The focus detection device according to the present embodiment are the same as the focus detection device in the above-described first embodiment except that the configuration of the photoelectric conversion device 10 is different.

First, with respect to the definition of directions used in the description, differences from the first embodiment will be described. In the description in the first embodiment, the direction in which the control line 14 extends is the X-direction. That is, the plurality of pixels P included in a single row are aligned in the X-direction. Further, in the description in the first embodiment, the direction in which the output line 16 extends is the Y-direction. That is, the plurality of pixels P included in a single column are aligned in the Y-direction.

In contrast, in the present embodiment, the direction in which the control line 14 extends is the Y-direction. That is, the plurality of pixels P included in a single row are aligned in the Y-direction. Further, in the present embodiment, the direction in which the output line 16 extends is the X-direction. That is, the plurality of pixels P included in a single column are aligned in the X-direction. Note that the description regarding rows and columns in the first embodiment is applied to the present embodiment in the same manner.

In the photoelectric conversion device 10 of the present embodiment, the row select circuit 20 is connected to the control lines 14 extending in the Y-direction and selects, out of the plurality of rows aligned in the X-direction, a row from which a signal is to be read out. The readout circuit 22 is connected to the output lines 16 extending in the X-direction. The column select circuit 24 is connected to the readout circuit 22 and selects, out of the plurality of columns aligned in the Y-direction, a column from which a signal is to be read out.

FIG. 8 is a diagram illustrating a configuration example of the pixel region 12 of the photoelectric conversion device 10 according to the present embodiment. As an example here, a case where 12 pixels P are aligned in the Y-direction and 25 pixels P are aligned in the X-direction is illustrated as an example. In FIG. 8, the alignment in the X-direction is defined as a row, and the alignment in the Y-direction is defined as a column. That is, the pixels P of 25 rows by 12 columns are arranged in the pixel region 12.

The pair of focus detection regions 42 and 44 in the center focus detection block are each illustrated as a region formed of a pixel array of three rows by four columns as an example. The pair of focus detection regions 42 and 44 are used for parallax detection in the Y-direction. The optically paired pixels P in the focus detection regions 42 and 44 are connected to the common control line 14. Further, the pair of focus detection regions 46 and 48 are each illustrated as a region formed of a pixel array of three rows by four columns as an example. The pair of focus detection regions 46 and 48 are used for parallax detection in the X-direction. The optically paired pixels P in the focus detection regions 46 and 48 are connected to the common output line 16.

Each of the focus detection regions 52, 54, 56, 58, 62, 64, 66, and 68 in other focus detection blocks is similar to the focus detection regions 42, 44, 46, and 48. Each of the focus detection regions 52, 54, 56, 58, 62, 64, 66, and 68 illustrated as a region formed of a pixel array of two rows by four columns as an example. The focus detection regions 52 and 54 are used for parallax detection in the Y-direction, and the focus detection regions 62 and 64 are used for parallax detection in the Y-direction. The focus detection regions 56 and 58 are used for parallax detection in the X-direction, and the focus detection regions 66 and 68 are used for parallax detection in the X-direction.

In the photoelectric conversion device of the present embodiment, although the definitions of a row and a column are exchanged, the arrangement of the focus detection regions 42, 44, 46, 48, 52, 54, 56, 58, 62, 64, 66, and 68 with respect to the X-direction and the Y-direction is the same as the case of the photoelectric conversion device of the first embodiment.

Next, a method of driving the photoelectric conversion device according to the present embodiment will be described by using FIG. 9. In this example, the method of driving the photoelectric conversion device will be described with an example of the case where the pixel region 12 has three focus detection blocks illustrated in FIG. 8.

In the method of driving the photoelectric conversion device according to the present embodiment, divided regions in accordance with focus detection blocks are defined in the pixel region 12, and the pixels P are driven on a divided region basis. For example, when the pixel region 12 includes three focus detection blocks as illustrated in FIG. 8, the pixel region 12 is divided into three divided regions 40, 50, and 60 in a unit of row as illustrated in FIG. 9. The divided region 40 is a region including the focus detection regions 42, 44, 46, and 48. The divided region 50 is a region including the focus detection regions 52, 54, 56, and 58. The divided region 60 is a region including the focus detection regions 62, 64, 66, and 68.

Driving of the pixels P by the row select circuit 20 is performed sequentially on a divided region basis in a unit of row. Thereby, signals of respective pixels P on the selected row are output to the readout circuit 22 via the output lines 16. The column select circuit 24 sequentially selects columns and sequentially outputs pixel signals on the selected columns as an output signals SOUT in the same manner as the case of a typical area sensor. Thereby, the number of pixel signals to be output is reduced compared to the case where the pixel signals on all the columns are output, which enables a high speed readout of the focus detection signal.

For example, it is assumed that readout of signals from the pixels P belonging to the divided region 40 out of three divided regions 40, 50, and 60 of FIG. 9 is performed first. In this case, the rows occupied by the divided region 40 of all the rows is approximately ⅓, and thus the row scan period can be reduced to approximately ⅓. The pixel signals obtained from the divided region 40 include parallax information in the X-direction and the Y-direction, and reduction in the time before the readout of pixel signals from the divided region 40 is completed enables earlier start of focus detection calculation. This allows for quick feedback to automatic focus adjustment of the imaging lens or the like.

Readout of pixel signals from the divided regions 50 and 60 may be performed after readout of pixel signals from the divided region 40, if necessary. Readout of pixel signals from the divided regions 50 and 60 can be performed in parallel to focus detection calculation based on focus detection signals acquired from the divided region 40.

As described above, in the photoelectric conversion device according to the present embodiment, a pair of the pixels P forming focus detection regions corresponding to the parallax detection in the X-direction are connected to the common output line 16. Further, a pair of the pixels P forming focus detection regions corresponding to the parallax detection in the Y-direction are connected to the common control line 14. Therefore, more pixels P can be arranged for a focus detection region determined by optical conditions, and thus the resolution of a captured image can be improved. Further, since the pixel control unit (the row select circuit 20) and the signal processing unit (the readout circuit 22, the column select circuit 24) can be shared, the focus detection region can be expanded or more focus detection regions can be provided. This can improve the focus detection accuracy.

Furthermore, in the photoelectric conversion device according to the present embodiment, the control lines 14 are independent for each paired focus detection regions in the focus detection regions used for parallax detection in the X-direction. Also, the control lines 14 are independent for each paired focus detection regions in the focus detection regions used for parallax detection in the Y-direction. Further, there is no control line 14 common to the focus detection region used for parallax detection in the X-direction and the focus detection region used for parallax detection in the Y-direction. That is, it is possible to control the exposure period or the readout operations of pixel signals of the pixels P for each paired focus detection region. Therefore, a suitable exposure time can be set in accordance with the brightness or darkness of an object corresponding to each of the focus detection regions, which can improve the focus detection accuracy.

Further, since the divided regions 40, 50, and 60 are divided by rows, it is possible to sequentially output signals of respective divided regions by simply controlling the order of selecting rows by using the row select circuit 20. Therefore, the circuit size can be reduced compared to the case of the first embodiment.

As discussed above, according to the present embodiment, both improvement in the focus detection accuracy and increase in the focus detection speed can be achieved.

Third Embodiment

Figure 10:
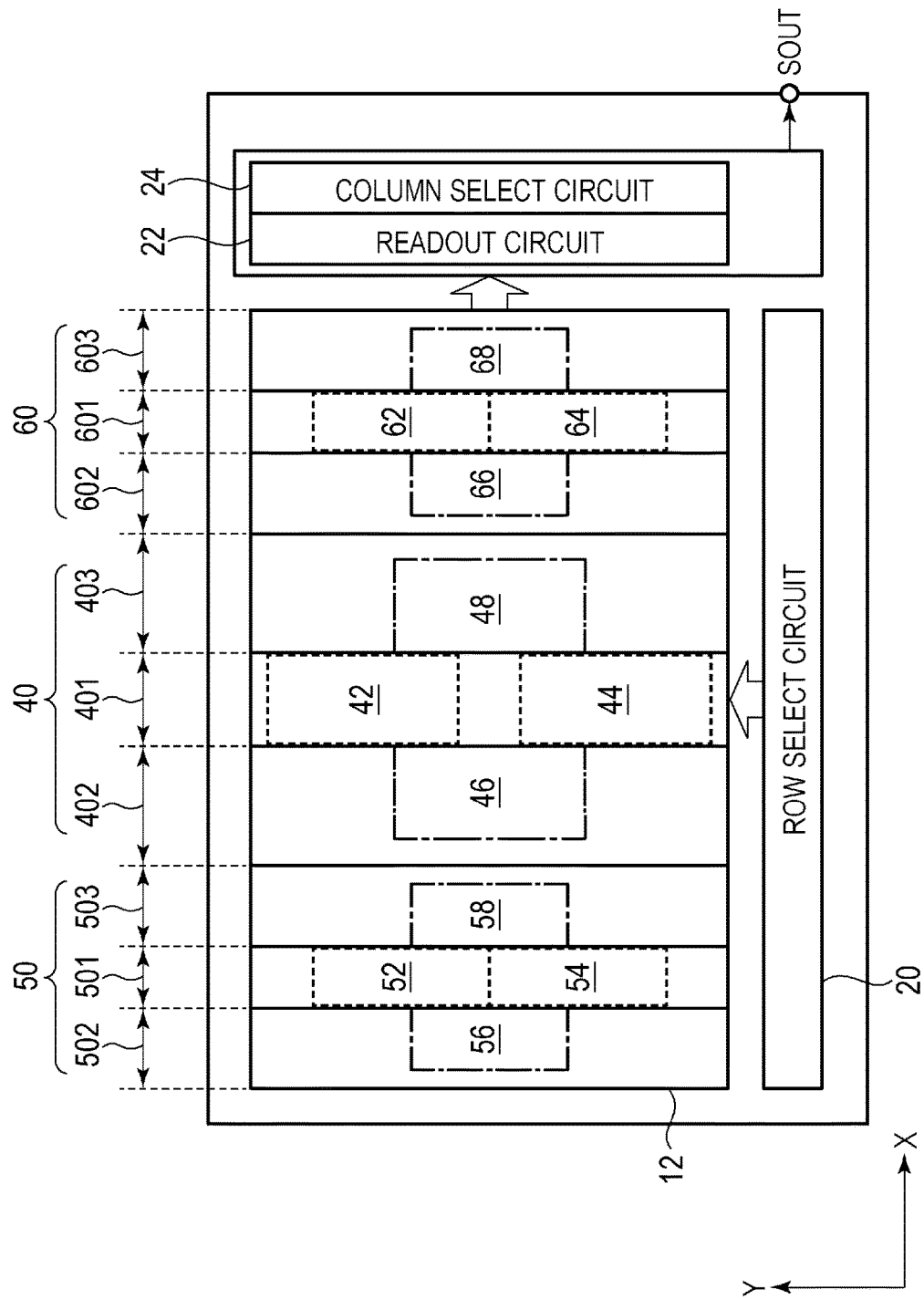
FIG. 10 and FIG. 11 are schematic diagrams illustrating a relationship between divided regions and focus detection regions in the photoelectric conversion device according to a third embodiment.
Figure 11:
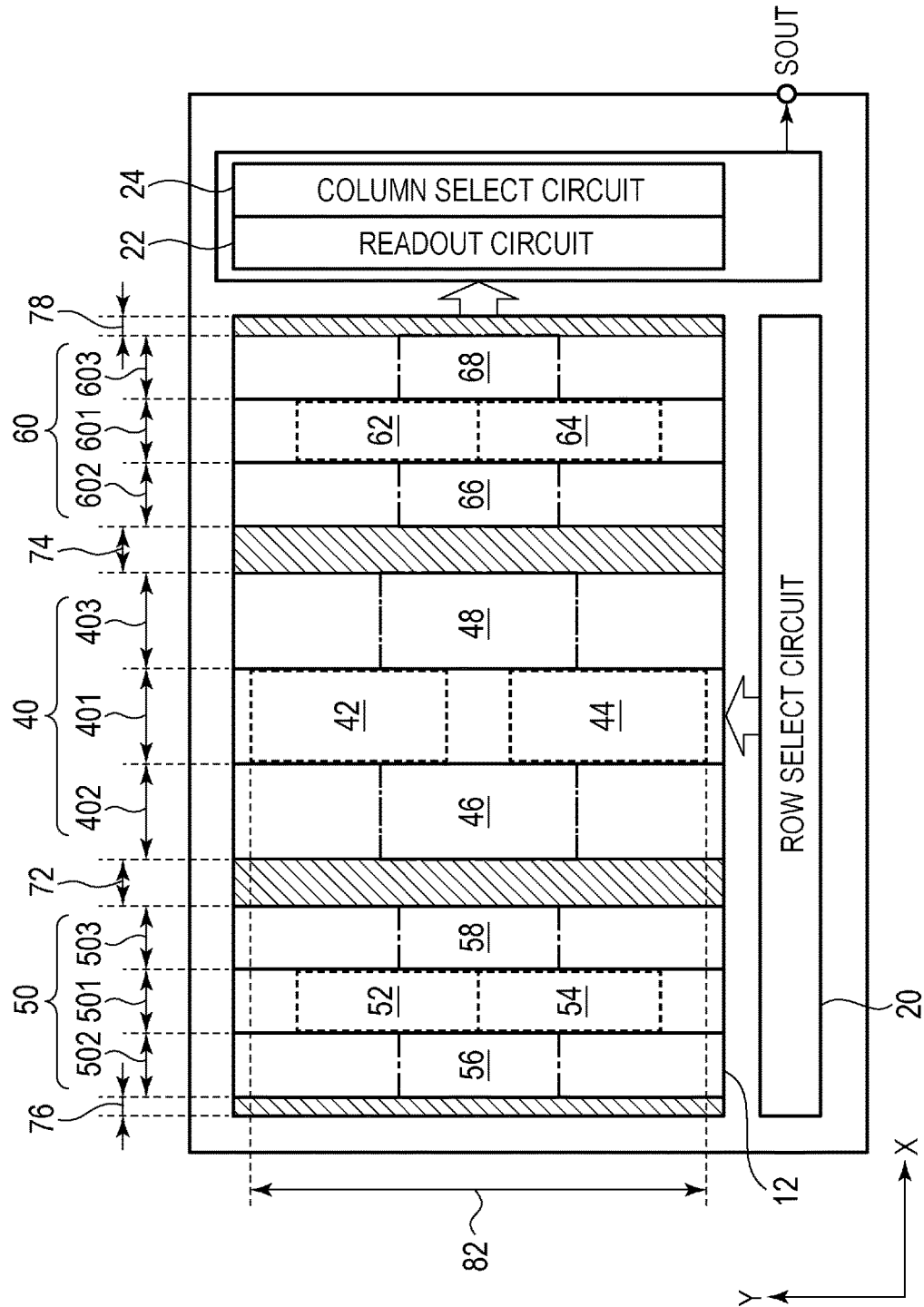

A focus detection device according to a third embodiment of the present invention will be described with reference to FIG. 10 and FIG. 11. Similar components to those of the focus detection devices according to the first and second embodiments illustrated in FIG. 1 to FIG. 8 are labeled with the same reference, and the description thereof will be omitted or simplified. FIG. 10 and FIG. 11 are schematic diagrams illustrating a relationship between divided regions and focus detection regions in the photoelectric conversion device according to the present embodiment. The definitions of the X-direction and the Y-direction are the same as those in the second embodiment.

The focus detection device according to the present embodiment are the same as the focus detection device in the second embodiment except that setting ranges of divided regions of the pixel region 12 in the photoelectric conversion device 10 are different. That is, in the photoelectric conversion device of the present embodiment, the pixel region 12 is divided into a divided region including a single focus detection region used for parallax detection in the X-direction and a divided region including two focus detection regions, which are paired, used for parallax detection in the Y-direction.

In describing the present embodiment in relation to the second embodiment, the divided region 40 is further divided into a divided region 401 including the focus detection regions 42 and 44, a divided region 402 including the focus detection region 46, and a divided region 403 including the focus detection region 48. Further, the divided region 50 is further divided into a divided region 501 including the focus detection regions 52 and 54, a divided region 502 including the focus detection region 56, and a divided region 503 including the focus detection region 58. Further, the divided region 60 is further divided into a divided region 601 including the focus detection regions 62 and 64, a divided region 602 including the focus detection region 66, and a divided region 603 including the focus detection region 68.

With such a configuration, only the pixel signals from the pixels P in the two focus detection regions, which are paired, used for parallax detection in the Y-direction can be output first. In particular, two focus detection regions, which are paired, used for parallax detection in the Y-direction are aligned on the same row, and the exposure time or the readout operation of pixel signals of the pixels P can be controlled at the same time. For example, in the pixel configuration illustrated in FIG. 8, it is possible to control the exposure time or the readout operation of pixel signals of the pixels P belonging to the focus detection regions 42 and 44 by only driving the control lines 14 from the 12-th row to the 14-th row. Therefore, the focus detection calculation in the Y-direction can be started at a further earlier time, and this allows for quick feedback to automatic focus adjustment of the imaging lens or the like.

The readout of the pixel signals from the pixels P in the focus detection regions used for parallax detection in the X-direction may be performed after the readout of the pixel signals from the pixels P in the focus detection regions used for parallax detection in the Y-direction, if necessary. The readout of the pixel signals from the pixels P in the focus detection regions used for parallax detection in the X-direction can be performed in parallel to focus detection calculation based on signals used for focus detection acquired from the pixels P in the focus detection regions used for parallax detection in the Y-direction.

Further, it is effective to perform readout of pixel signals from the pixels P of the divided regions 401, 501, and 601 prior to readout of pixel signals from the pixels P of the divided regions 402, 403, 502, 503, 602, and 603. With such a configuration, when a wide range of focus detection calculation is required for an object or the like, for example, faster focus detection can be made than in the case of the first and second embodiments.

FIG. 11 illustrates another setting example of divided regions. In FIG. 11, regions including rows which do not overlap with focus detection regions in the configuration of FIG. 10 are excluded from the divided regions including focus detection regions. In FIG. 11, divided regions 72, 74, 76, and 78 are regions including rows which do not overlap with the focus detection regions. The row select circuit 20 is configured to be able to select rows corresponding to the divided regions 401, 402, 403, 501, 502, 503, 601, 602, and 603. Further, the row select circuit 20 is configured to be able to control the exposure time or the readout operation of pixel signals of the pixels P for each of the divided regions 401, 402, 403, 501, 502, 503, 601, 602, and 603. Further, the column select circuit 24 is configured to be able to select columns 82 corresponding to the focus detection regions. With such a configuration, the output signals SOUT can be formed of only the pixel signals from rows including the focus detection regions, the focus detection speed can be further improved.

As discussed above, according to the present embodiment, both improvement in the focus detection accuracy and increase in the focus detection speed can be achieved.

Fourth Embodiment

Figure 12:
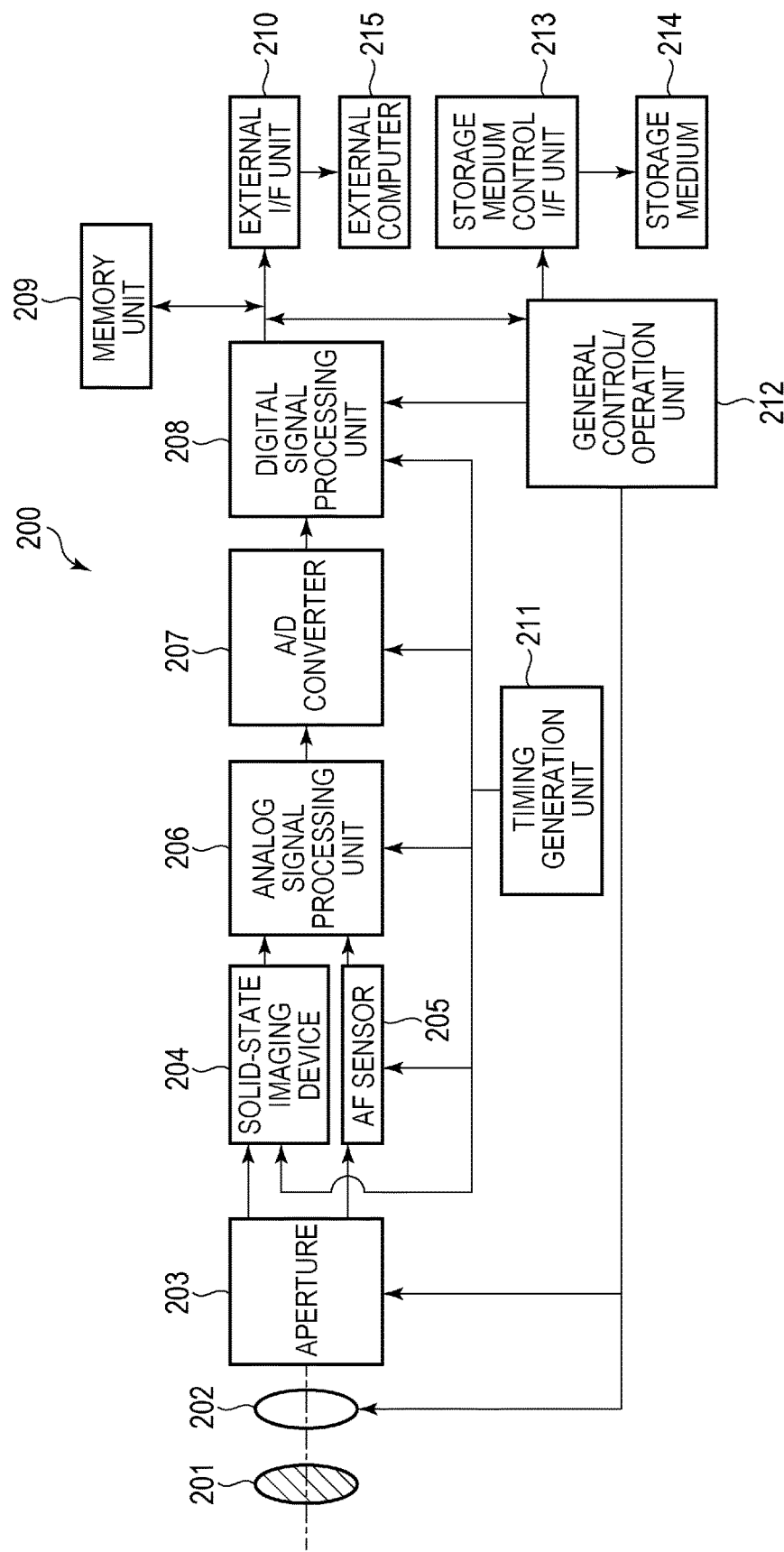
FIG. 12 is a block diagram illustrating a general configuration of an imaging system according to a fourth embodiment.

An imaging system according to a fourth embodiment of the present invention will be described with reference to FIG. 12. Similar components to those of the focus detection devices according to the first to third embodiments illustrated in FIG. 1 to FIG. 11 are labeled with the same reference, and the description thereof will be omitted or simplified. FIG. 12 is a block diagram illustrating a configuration example of the imaging system according to the present embodiment.

As illustrated in FIG. 12, an imaging system 200 according to the present embodiment has a barrier 201, a lens 202, an aperture 203, a solid-state imaging device 204, and an AF sensor 205. The lens 202 is an optical system for capturing an optical image of an object. The barrier 201 protects the lens 202. The aperture 203 adjusts the light amount of a light passing through the lens 202. The solid-state imaging device 204 acquires an optical image of an object captured by the lens as an image signal. The AF sensor 205 is the focus detection device 100 described in the first to third embodiments.

Further, the imaging system 200 further has an analog signal processing unit 206, an A/D converter 207, and a digital signal processing unit 208. The analog signal processing unit 206 processes signals output from the solid-state imaging device 204 and the AF sensor 205. The A/D converter 207 performs analog-to-digital conversion on a signal output from the analog signal processing unit 206. The digital signal processing unit 208 performs various correction on image data output from the A/D converter 207 or performs a process of compressing data.

Further, the imaging system 200 further has a memory unit 209, an external I/F circuit 210, a timing generation unit 211, a general control/operation unit 212, and a storage medium control I/F unit 213. The memory unit 209 temporarily stores image data. The external I/F circuit 210 communicates with an external device such as an external computer 215. The timing generation unit 211 outputs various timing signals to the digital signal processing unit 208 or the like. The general control/operation unit 212 controls various calculation and the entire camera. The storage medium control I/F unit 213 exchanges data with a removable storage medium 214 such as a semiconductor memory used for storing the acquired image data or performing readout of image data.

When the barrier 201 is opened, an optical image from an object enters the AF sensor 205 via the lens 202 and the aperture 203. The general control/operation unit 212 calculates the distance to an object by using the above-described phase difference detection based on an output signal from the AF sensor 205. The general control/operation unit 212 then performs autofocus control to drive the lens 202 based on a calculation result, again determine whether or not focused, and again drive the lens 202 when determined to be out of focus.

Subsequently, after confirmed to be focused, a charge accumulation operation by the solid-state imaging device 204 is started. Upon the completion of the charge accumulation operation of the solid-state imaging device 204, an image signal output from the solid-state imaging device 204 is subjected to a predetermined process in the analog signal processing unit 206 and then digitally converted by the A/D converter 207. The digitally converted image signal is written to the memory unit 209 by the general control/operation unit 212 via the digital signal processing unit 208.

Then, data accumulated in the memory unit 209 is stored in the storage medium 214 via the storage medium control I/F unit 213 by the general control/operation unit 212. Alternatively, data accumulated in the memory unit 209 may be input directly to the external computer 215 via the external I/F circuit 210.

As described in the first to third embodiments, by configuring the AF sensor 205 using the focus detection device 100 illustrated in any of the above embodiments, it is possible to increase the focus detection speed while improving the focus detection accuracy. Therefore, according to the imaging system of the present embodiment using such the AF sensor 205, a higher-definition image can be acquired quickly.

Modified Embodiments

The present invention is not limited to the above-described embodiments, and various modifications are possible.

For example, an example in which a part of the configuration of any of the embodiments is added to another embodiment or an example in which a part of the configuration of any of the embodiments is replaced with a part of the configuration of another embodiment is one of the embodiments of the present invention.

Further, in the photoelectric conversion devices in the first to third embodiments, the pixel circuit forming each of the pixels P is not limited to that illustrated in FIG. 3. For example, the pixel P is not necessarily required to have the configuration supporting a global electronic shutter operation, and the transfer transistor M2 and the overflow transistor M6 may not be provided. In this case, charges accumulated in the photoelectric converter PD are transferred by the transfer transistor M1 to the FD portion (holding portion C2).

Further, while the example in which two or six pairs of the focus detection regions are arranged in the pixel region 12 has been described in the above first to third embodiments, the number of pairs of the focus detection regions arranged in the pixel region 12 is not limited thereto. Further, the number of divided regions dividing the pixel region 12 is not limited to the example of the embodiments described above.

Further, the imaging system illustrated in the fourth embodiment described above illustrates an example of an imaging system to which the focus detection device of the present invention can be applied, imaging systems to which the focus detection device of the present invention can be applied is not limited to the configuration illustrated in FIG. 12.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-089427, filed Apr. 28, 2017, which is hereby incorporated by reference herein in its entirety.

What is claimed is:

1. A focus detection device comprising:
a field lens;
a secondary image forming lens configured to capture a light flux that has passed through the field lens and to form a pair of images from light fluxes that have passed through different pupil positions of an imaging lens; and
a photoelectric conversion device including a pixel region including at least one focus detection region pair that detects the pair of images,
wherein the photoelectric conversion device includes:
a plurality of pixels arranged in the pixel region so as to form a matrix of a plurality of rows and a plurality of columns, wherein each of the plurality of pixels includes a photoelectric converter, an amplifier transistor, and a transfer transistor that transfers charges to the amplifier transistor;
a plurality of control lines arranged correspondingly to the plurality of rows, each of the plurality of control lines supplying a control signal to at least a part of pixels on a corresponding row of the plurality of rows;
a plurality of output lines arranged correspondingly to the plurality of columns, each of the plurality of output lines receiving a signal from at least a part of pixels on a corresponding column of the plurality of columns; and
a signal processing unit connected to the plurality of output lines arranged in the pixel region and configured to sequentially select and output signals of the output lines,
wherein the pixel region includes a first focus detection region pair to detect a parallax in a first direction and a second focus detection region pair to detect a parallax in a second direction intersecting the first direction,
wherein, in the first focus detection region pair, the pair of pixels that output signals to be used for focus detection are connected to a common control line extending in the first direction,
wherein, in the second focus detection region pair, the paired pixels that output signals to be used for focus detection are connected to a common output line extending in the second direction,
wherein the pixel region includes a plurality of divided regions divided in the first direction,
wherein the plurality of divided regions includes a first divided region including the first focus detection region pair and the second focus detection region pair, and
wherein the signal processing unit reads out signals of pixels on a first row included in the first divided region and then reads out signals of pixels on a second row included in the first divided region before reading out signals of pixels in another divided region.

2. The focus detection device according to claim 1, wherein a plurality of the pixels included in a single row are connected to the control lines that are different for each of the plurality of divided regions.

3. The focus detection device according to claim 1, wherein the plurality of divided regions further include a second divided region and a third divided region, and wherein the first divided region is arranged between the second divided region and the third divided region.

4. The focus detection device according to claim 1, wherein the number of the plurality of rows is less than the number of the plurality of columns.

5. The focus detection device according to claim 1, wherein a plurality of blocks each including the first focus detection region pair and the second focus detection region pair are arranged in the pixel region.

6. The focus detection device according to claim 1, wherein each of the plurality of pixels further includes a charge holding portion that holds charges transferred from the photoelectric converter, and the transfer transistor transfers charges held by the charge holding portion to the amplifier transistor.

7. A focus detection device comprising:
a field lens;
a secondary image forming lens configured to capture a light flux that has passed through the field lens and to form a pair of images from light fluxes that have passed through different pupil positions of an imaging lens; and
a photoelectric conversion device including a pixel region including at least one focus detection region pair that detects the pair of images,
wherein the photoelectric conversion device includes:
a plurality of pixels arranged in the pixel region so as to form a matrix of a plurality of rows and a plurality of columns, wherein each of the plurality of pixels includes a photoelectric converter, an amplifier transistor, and a transfer transistor that transfers charges to the amplifier transistor;
a plurality of control lines arranged correspondingly to the plurality of rows, each of the plurality of control lines supplying a control signal to at least a part of pixels on a corresponding row of the plurality of rows;
a plurality of output lines arranged correspondingly to the plurality of columns, each of the plurality of output lines receiving a signal from at least a part of pixels on a corresponding column of the plurality of columns; and
a pixel control unit connected to the plurality of control lines arranged in the pixel region and configured to sequentially select the control lines to supply the control signal to the selected control lines,
wherein the pixel region includes a first focus detection region pair to detect a parallax in a first direction and a second focus detection region pair to detect a parallax in a second direction intersecting the first direction,
wherein, in the first focus detection region pair, the pair of pixels that output signals to be used for focus detection are connected to a common control line extending in the first direction,
wherein, in the second focus detection region pair, the paired pixels that output signals to be used for focus detection are connected to a common output line extending in the second direction,
wherein the pixel region includes a plurality of divided regions divided in the second direction, and wherein the plurality of divided regions include a first divided region in which the first focus detection region pair is arranged, a second divided region in which one focus detection region of the second focus detection region pair is arranged, and a third divided region in which the other focus detection region of the second focus detection region pair is arranged.

8. The focus detection device according to claim 7, wherein the pixel control unit is configured to perform readout of signals from the pixels of the second focus detection region pair arranged in the second divided region and the third divided region after performing readout of signals from the pixels of the first focus detection region pair arranged in the first divided region.

9. The focus detection device according to claim 7, wherein the first divided region is arranged between the second divided region and the third divided region.

10. The focus detection device according to claim 7, wherein the pixel control unit is configured to select only the control line connected to the pixels forming the first focus detection region pair or the second focus detection region pair out of the plurality of control lines arranged in the pixel region.

11. The focus detection device according to claim 7,
wherein the photoelectric conversion device further includes a signal processing unit connected to the plurality of output lines arranged in the pixel region, and
wherein the signal processing unit is configured to select only the output line connected to the pixels forming the first focus detection region pair or the second focus detection region pair out of the plurality of output lines arranged in the pixel region.

12. The focus detection device according to claim 7, wherein the first direction is a shorter side direction of the pixel region, and the second direction is a longer side direction of the pixel region.

13. The focus detection device according to claim 7, wherein the number of the plurality of rows is greater than the number of the plurality of columns.

14. The focus detection device according to claim 7, wherein a plurality of blocks each including the first focus detection region pair and the second focus detection region pair are arranged in the pixel region.

15. The focus detection device according to claim 7, wherein each of the plurality of pixels further includes charge holding portion that holds charges transferred from the photoelectric converter, and the transfer transistor transfers charges held by the charge holding portion to the amplifier transistor.

16. The focus detection device according to claim 7, wherein the pixel region includes a region not to be used for a focus detection region, the region being provided between the plurality of divided regions.

17. A focus detection device comprising:
a field lens;
a secondary image forming lens configured to capture a light flux that has passed through the field lens and to form a pair of images from light fluxes that have passed through different pupil positions of an imaging lens; and
a photoelectric conversion device including a pixel region including at least one focus detection region pair that detects the pair of images,
wherein the photoelectric conversion device includes a plurality of pixels arranged in the pixel region so as to form a matrix of a plurality of rows and a plurality of columns,
wherein each of the plurality of pixels includes a photoelectric converter, an amplifier transistor, and a transfer transistor that transfers charges to the amplifier transistor,
wherein the photoelectric conversion device includes a plurality of control lines arranged correspondingly to the plurality of rows, each of the plurality of control lines supplying a control signal to at least a part of pixels on a corresponding row of the plurality of rows,
wherein the photoelectric conversion device includes a plurality of output lines arranged correspondingly to the plurality of columns, each of the plurality of output lines receiving a signal from at least a part of pixels on a corresponding column of the plurality of columns,
wherein at least a pair of the pixels connected to a common control line of the plurality of control lines or connected to a common output line of the plurality of output lines form the at least one focus detection region pair and output signals to be used for focus detection,
wherein the pixel region of the photoelectric conversion device includes a first focus detection region pair to detect a parallax in a first direction and a second focus detection region pair to detect a parallax in a second direction intersecting the first direction,
wherein, in the first focus detection region pair, the pair of pixels that output signals to be used for focus detection are connected to a common control line extending in the first direction,
wherein, in the second focus detection region pair, the paired pixels that output signals to be used for focus detection are connected to a common output line extending in the second direction,
wherein the photoelectric conversion device further includes a pixel control unit connected to the plurality of control lines arranged in the pixel region,
wherein the pixel control unit is configured to sequentially select the control lines to supply the control signal to the selected control lines, and
wherein the first direction is a shorter side direction of the pixel region, and the second direction is a longer side direction of the pixel region.

* * * * *